(12) United States Patent
Ehrhart et al.

(10) Patent No.: US 6,384,504 B1
(45) Date of Patent: May 7, 2002

(54) ELECTRIC MACHINE WITH A ROTOR CONSTRUCTED OF PERMANENT MAGNETS AND MAGNETIC FLUX GUIDES

(75) Inventors: Peter Ehrhart, München; Gerhard Reiner, Pähl; Ludwig Lindner, München; Christian Lucas, Martinsried; Fritz Walter, Raisting, all of (DE)

(73) Assignee: Magnet-Motor Gesellschaft für magnetmotorische Technik mbH, Starnberg (DE)

( * ) Notice: Subject to any disclaimer, the term of this patent is extended or adjusted under 35 U.S.C. 154(b) by 0 days.

(21) Appl. No.: 09/486,654
(22) PCT Filed: Aug. 26, 1998
(86) PCT No.: PCT/EP98/05417
    § 371 Date: Feb. 28, 2000
    § 102(e) Date: Feb. 28, 2000
(87) PCT Pub. No.: WO99/10962
    PCT Pub. Date: Mar. 4, 1999

(30) Foreign Application Priority Data

Aug. 27, 1997 (DE) .......................................... 197 37 391

(51) Int. Cl.[7] .......................... H02K 21/02; H02K 29/00
(52) U.S. Cl. ............................ 310/156.55; 310/156.18; 310/156.22; 310/156.65
(58) Field of Search ................................ 310/216, 217, 310/89, 91, 261, 156; 29/596–598

(56) References Cited

U.S. PATENT DOCUMENTS 2,907,903 A   10/1959   Reijnst

FOREIGN PATENT DOCUMENTS

DE   909 472   4/1954

(List continued on next page.)

Primary Examiner—Tran Nguyen
(74) Attorney, Agent, or Firm—Venable; Catherine M. Voorhees (57) ABSTRACT

An electric machine comprising a stator and a rotor (2) separated by an air gap (12), (List continued on next page.)

U.S. PATENT DOCUMENTS

(a) the rotor (2) being composed with permanent magnets (8) magnetized substantially in circumferential direction, and with one magnetic flux conducting piece assembly (10) of at least one magnetic flux conducting piece (10a; 10b) between two adjacent permanent magnets each;

(b) the permanent magnets (8)—when looking at the overall geometry—each having an increasing circumferential width from the head portion on the side of the air gap to the foot portion;

(c) and the conducting piece assemblies (10) between two adjacent permanent magnets (8)—when looking at the overall geometry—each having a decreasing circumferential width from the head portion on the side of the air gap to the foot portion, characterized in (d) that the conducting pieces (10a; 10b) at the foot end each have a widened portion in circumferential direction, having at least one shoulder (20) through which they are supported on an adjacent permanent magnet (8) against displacement in the direction towards the air gap (12).

9 Claims, 5 Drawing Sheets

U.S. PATENT DOCUMENTS

| | | | |
|---|---|---|---|
| 3,803,431 A | * 4/1974 | Inaba et al. | 310/49 R |
| 4,336,649 A | 6/1982 | Glaser | |
| 4,339,874 A | * 7/1982 | Mc'Carty et al. | 29/598 |
| 4,363,984 A | * 12/1982 | Torii et al. | 310/156 |
| 4,459,500 A | * 7/1984 | Miyamoto | 310/154 |
| 4,631,807 A | * 12/1986 | Kawada et al. | 29/598 |
| 4,661,730 A | * 4/1987 | Maruyama et al. | 310/12 |
| 4,900,965 A | * 2/1990 | Fisher | 310/216 |
| 5,128,575 A | * 7/1992 | Heidelberg et al. | 310/156 |
| 5,243,242 A | * 9/1993 | Cap et al. | 310/67 R |
| 5,289,072 A | * 2/1994 | Lange | 310/266 |
| 5,298,827 A | * 3/1994 | Sugiyama | 310/156 |
| 5,731,649 A | * 3/1998 | Caamano | 310/216 |
| 5,739,614 A | * 4/1998 | Suzuki et al. | 310/180 |
| 5,786,650 A | * 7/1998 | Uchida et al. | 310/156 |
| 5,834,866 A | * 11/1998 | Fujitani et al. | 310/49 R |
| 5,994,802 A | * 11/1999 | Shichijyo et al. | 310/156 |

FOREIGN PATENT DOCUMENTS

| | | |
|---|---|---|
| DE | 84 27 703.3 | 3/1986 |
| DE | 39 13 618 | 11/1991 |
| DE | 91 16 192 | 3/1992 |
| DE | 40 33 454 | 4/1992 |
| DE | 44 00 614 | 6/1994 |
| DE | 43 30 272 | 12/1994 |
| DE | 43 41 514 | 6/1995 |
| DE | 44 26 241 | 2/1996 |
| EP | 0 107 317 | 5/1984 |
| EP | 0 331 180 | 9/1989 |
| EP | 0 779 696 | 6/1997 |
| FR | 528 971 | 11/1921 |
| FR | 2 490 423 | 3/1982 |
| FR | 2 159 342 | 11/1985 |
| FR | 2 594 272 | 8/1987 |
| FR | 2 650 713 | 2/1991 |
| GB | 2 297 870 | 8/1996 |

* cited by examiner

ELECTRIC MACHINE WITH A ROTOR CONSTRUCTED OF PERMANENT MAGNETS AND MAGNETIC FLUX GUIDES

BACKGROUND OF THE INVENTION

The invention relates to an electric machine comprising a stator and a rotor separated by an air gap, with
(a) the rotor being composed with permanent magnets magnetized substantially in a circumferential direction, and with one magnetic flux conducting piece assembly including at least one magnetic flux conducting piece between two adjacent permanent magnets;
(b) the permanent magnets—when looking at the overall geometry—each having an increasing circumferential width from the head portion on the side of the air gap to the foot portion;
(c) and the conducting piece assemblies between two adjacent permanent magnets—when looking at the overall geometry—each having a decreasing circumferential width from the head portion on the side of the air gap to the foot portion.

The electric machine may be, in particular, an electric motor or a current generator. The invention relates, in particular, to electric machines in which the air gap has a substantially cylindrical configuration.

In the electric machines of the type indicated at the outset, a considerable magnetic force acts on each of the magnetic flux conducting pieces in the direction towards the air gap. When the machine is formed with an internal rotor, the centrifugal force acting on the magnetic flux conducting piece assembly is superimposed on the force of attraction during operation of the machine so as to increase the same. When the machine is formed with an external rotor, the centrifugal force now acting on the magnetic flux conducting piece assemblies in the opposite direction is superimposed on the magnetic force of attraction during operation of the machine. The overall geometry of the conducting piece assemblies with decreasing circumferential width from the head portion on the side of the air gap to the foot portion further aggravates safe locating of the conducting piece assemblies in the rotor.

SUMMARY OF THE INVENTION

The problem to be solved by the invention is to make available electric machines of the type indicated at the outset, in which the conducting piece assemblies are held on the rotor in a constructionally simple, but nevertheless extremely reliable manner.

According to a first solution of this problem, the machine according to the invention is characterized in
(d) that the conducting pieces at the foot end each have a widened portion in circumferential direction, having at least one shoulder through which they are supported on an adjacent permanent magnet against displacement in the direction towards the air gap.

Due to the provision of the widened portion at the foot end of the particular conducting piece, the widened portion indeed is not located in an optimum region under the aspect of mechanical strength, said region being narrower in circumferential direction than at a location further towards the head end. On the other hand, the widened portion is situated in a region where the relatively lowest impairment results for the configuration that is advantageous in terms of magnetic flux passage.

It is pointed out that the at least one shoulder need not necessarily extend substantially in tangential direction of the rotor (although this constitutes a preferred embodiment), but may also extend obliquely with respect to the tangential direction, but parallel to the rotor axis.

According to a second solution of the above-indicated problem according to the invention the machine is characterized in
(d) that the conducting pieces each have at least one shoulder through which they are supported on a supporting member against displacement in the direction towards the air gap, the supporting member being constituted by the rotor or attached to the rotor.

In this solution according to the invention, the at least one shoulder thus is no longer provided necessarily at the foot end of the respective conducting piece, but may be provided at any location of the radial extension of the conducting piece.

With numerous embodiments of the invention, the respective conducting piece assembly comprises only one conducting piece between two adjacent permanent magnets. Especially in this case, it is, as a rule, practical and favorable to provide the respective conducting piece on both sides with a shoulder, though it is alternatively possible, as well, to utilize a shoulder on only one side of the conducting piece.

According to another, preferred development of the invention the conducting piece assemblies consist of two conducting pieces each, having a shoulder on one side or on both sides. Conducting piece assemblies with more than two conducting pieces are possible as well.

Preferably, two conducting pieces each of adjacent conducting piece assemblies can be connected to each other via the permanent magnet disposed therebetween. This results in a U-shaped conducting piece configuration enclosing the interposed permanent magnet and thus being supported on the latter.

It is preferred, furthermore, that a pocket be formed between the two conducting pieces of the respective conducting piece assembly, in which a supporting member is disposed. With this configuration, a portion of the conducting pieces that is not adjacent the permanent magnets thus is employed for fixing them to the rotor. According to a further development it is advantageous to connect two supporting members of two adjacent conducting piece assemblies so as to form a common supporting frame. This renders the construction somewhat more complex indeed, but provides the possibility of a particularly stable fixation of the supporting members on the rotor.

The expression "at least one shoulder" as used repeatedly hereinbefore covers on the one hand the possibilities that a shoulder is provided only on one circumferential end or that a shoulder is provided on both circumferential ends. On the other hand, this also covers the possibilities that two or even more shoulders are provided radially behind each other at the corresponding location (e.g. a so-called fir-tree foot), or only one shoulder without radially spaced neighbouring shoulder (which is the most frequent design).

According to a third solution of the problem mentioned, the machine according to the invention is characterized in
(d) that the conducting piece assemblies each include one conducting piece retained on the rotor by means of an axially extending bolt.

This construction is particularly simple with respect to the manufacture of the conducting piece assemblies, since no external shoulders, pockets or the like have to be produced, but rather the bolt can be passed e.g. through a drilled or punched hole in the conducting piece assembly. Provision of a bolt in the foot end region of the conducting piece normally is preferred since there the magnetic flux passage is impaired least.

According to a fourth preferred solution of the problem mentioned, the machine according to the invention is characterized in (d) that the rotor comprises a plurality of thin round plates spaced apart in the direction of the rotor axis, and in that the conducting piece assemblies and/or the permanent magnets are divided into axial partial lengths that are attached to the round plates.

The fourth solution realizes the conception that the forces arising at the conducting piece assemblies and/or the permanent magnets (in particular the forces of magnetic attraction in radial direction and the centrifugal forces) are divided to partial lengths of the conducting piece assemblies and/or of the permanent magnets, so as to dissipate them so to speak in shares. As will be pointed out in more detail hereinafter, there is a number of preferred possibilities of providing the connections between the partial lengths and the round plates, in particular by adhering and clamping them to each other. It is to be understood that the round plates preferably are fixed in the remainder of the rotor structure, e.g. also to the bandage to be described still in more detail hereinafter, and to that location dissipate the holding forces for holding the partial lengths of the conducting piece assemblies and/or the permanent magnets.

It is preferred to use non-ferromagnetic material for the round plates. It is particularly preferred when the material in addition thereto is not electrically conducting.

It is expressly pointed out that the four solutions disclosed, if desired also inclusive of one or several associated developments, can be combined with each other in twos, threes or also fours. Thus, it is possible e.g. to provide the fourth solution (attachment of axial partial lengths to round plates which in turn are part of the rotor or are attached thereto) along with the first solution (shoulder support of the conducting pieces on adjacent permanent magnets), so as to provide, so to speak, a second safety line.

The round plates preferably have essentially the same radial dimension as the conducting piece arrangements and the permanent magnets, or preferably have a radially projecting length on the side facing away from the air gap. In the first case, manufacture can also proceed such that a radially projecting length of the round plates radially inside and/or radially outside is provided first, which then is removed e.g. by turning. The alternative of maintaining a radially projecting length of the round plates on the side facing away from the air gap provides the advantage that mechanical stability of the rotor is increased, that longer rotors in axial direction can be built and that higher speeds of the rotor are permissible.

It is preferred according to a further development to clamp together the "package" of round plates and partial lengths of the conducting piece assemblies and/or of the permanent magnets by a plurality of circumferentially distributed, axially extending bolts. The bolts can extend through the afore-mentioned radially projecting length of the round plates. The material (permanent magnets, conducting piece assemblies) conducting the magnetic flux then is not reduced in its cross-section. However, it is also possible to provide edge recesses in the conducting piece assemblies and/or the permanent magnets and to have the bolts pass through the round plates and the recesses there, so that no additional space is required for the bolts in radial direction. Finally, it is possible to have the bolts pass through the holes in the round plates and through holes in the conducting piece assemblies and/or the permanent magnets.

The partial lengths of the conducting piece assemblies and/or permanent magnets preferably have recesses or elevations which, for positive engagement, engage with corresponding elevations and recesses in the round plates. In this case, holding together of the "package" of round plates and conducting piece arrangements and permanent magnets can take place with low clamping force since it is not necessary to rely (solely) on the holding effect by the frictional forces generated by such clamping together.

It is in general a great advantage in particular of the third and fourth solutions that a band or bandage to be described hereinafter is not cogently necessary (but may be present if desired). It is thus possible to avoid the additional thickness required for the bandage, and the machine can be built with smaller housing diameter or larger bore diameter. The structure without a bandage, furthermore, provides the prerequisite that two-sided machines, i.e. a stator radially inside the rotor and an additional stator radially outside the rotor, can be built without a problem.

The following preferred developments can be realized with all four solutions:

The conducting piece assemblies preferably are each symmetrical with respect to a radial plane containing the rotor axis. This often entails manufacturing advantages, but also advantages with respect to the more perfect distribution of the magnetic flux in the particular conducting piece assembly.

In a further development of the invention, it is preferred to form the conducting piece assemblies each as stacked sheet metal assembly, i.e. composed of stacked individual sheet metal plates each located in a plane perpendicularly to the rotor axis. Another favorable alternative is the manufacture of plastics-bound iron particles. However, the conducting piece assemblies need not necessarily be formed as stacked sheet metal assemblies or as stacked metal sheets that are as thin as the winding cores of the stator, since they are not permanently subjected to magnetization reversals.

The rotor preferably is an external rotor, with the permanent magnets and the conducting piece assemblies being mounted on the inside of an annular bandage, preferably of fiber-reinforced plastics material. The outer bandage is perfectly suited to take up the centrifugal forces acting on the permanent magnets and the conducting piece assemblies. However, it may also serve for attachment of the conducting piece assemblies to the rotor, as will be elucidated in more detail by some of the embodiments.

Around the outside of the bandage there may be provided a metallic layer for taking up residual magnetic flux, so that no eddy currents will be induced in a possibly provided outer metal housing of the machine.

When the metallic, layer is provided of ferromagnetic and electrically conducting material, the alternating flows towards the outside are efficiently shielded in the rotor area. It is particularly preferred to use stacked or laminated sheet metal material here, in order to reduce the losses associated with the shielding effect, i.e. the eddy currents. The layer in this respect is formed most suitably by round plates of stamped sheet metal which are stacked in axial direction. Depending on the strength of the metallic layer, it may be sufficient to design the annular bandage just as an isolating layer between permanent magnets and conducting piece assemblies on the one hand and the metallic layer on the other hand, i.e. it may be extremely thin. In the case of a design of such an insulating layer for taking up no considerable loads, the metallic layer in addition is given the function of a load-receiving bandage.

The induction of eddy currents in the outer metal housing of the machine may be prevented in equivalent manner by a laminated metallic sheet metal layer fixedly attached to the inside of the machine housing. In this respect, the same considerations apply as mentioned hereinbefore, however, the alternating flows caused by rotation need to be shielded in addition.

In a preferred development of the invention, the rotor at least on one side axially beside the permanent magnets and the conducting piece assemblies, is provided with a portion serving to mount the permanent magnets and/or the conducting pieces and/or the supporting members and/or the bolts. For, it is sometimes more expedient under constructional aspects not to change to a greater rotor diameter for attaching the components mentioned to the rotor, but to make use of the aforementioned, quasi axially juxtaposed portions.

It is frequently advantageous to provide an adhesive bond between the permanent magnets and the conducting pieces, possibly also between the several conducting pieces of a conducting piece assembly. The adhesive bonds unite the permanent magnets and the conducting pieces of the rotor so that these equal an integral whole. There are "soft" adhesives capable of allowing or taking up certain relative displacements between the two adhered components. On the other hand there are "hard" adhesives not having this effect. In carrying out the invention, it is also possible to use different adhesives at different locations of the rotor; this will be elucidated in more detail by an embodiment described further below.

At the beginning of the description, the expression "when looking at the overall geometry" (of the particular permanent magnet or of the particular conducting piece assembly) has been used. This is supposed to point out that the circumferential width does not necessarily have to increase or decrease, respectively, from head portion to foot portion in uniform or monotonous manner. It is dependent on the overall configuration, and e.g. an in total increasing circumferential width indeed may be decreasing over a distance and increase again thereafter. A good example can be seen in the widened portions at the foot end of the conducting pieces according to the invention. Although in case of the conducting piece assemblies—when looking at the overall configuration the circumferential width decreases from the head portion on the side of the air gap to the foot region, the expression can cover a more local widening in circumferential direction at the foot end.

It is pointed out in addition that the machine according to the invention preferably is composed in accordance with the flux concentration principle. The half of the flux exit area of each conducting piece assembly at the air gap is to be smaller than the projected area of one of the two adjacent permanent magnets, with the projected area being located in a radial plane containing the rotor axis. Due to this condition, a greater magnetic flux concentration is present at the air gap than at the magnetic flux-producing permanent magnets.

BRIEF DESCRIPTION OF THE DRAWINGS

The invention and further developments of the invention will be elucidated in more detail hereinafter by way of embodiments shown schematically in the drawings in which.

DETAILED DESCRIPTION OF THE INVENTION

The rotor 2 shown in the drawings consists in essence of an outer bandage 4 of fiber-reinforced plastics and of permanent magnets 8 and magnetic flux conducting piece assemblies 10—alternating with each other in a circumferential direction 6—on the inside of bandage 4. The air gap 12 of the electric machine (electric motor or current generator) to which illustrated rotor 2 belongs is situated at the radially inner circumference of rotor 2. Radially inside of the air gap, there is provided the stator 3 of the electric machine which in circumferential direction comprises a sequence of winding-carrying stator poles with the pitch of conducting piece-assemblies 10 or a pitch slightly different therefrom. It can be seen that the radially inwardly directed magnetic flux exit areas 14 of the flux conducting pieces are positioned a small distance further to the inside of the rotor than the radially inner confining areas 16 of permanent magnets 8. Nevertheless, air gap 12 can be referred to as being substantially cylindrical.

Apart from the configuration to be described in more detail hereinafter of the permanent magnets 8 and the conducting piece assemblies 10 for anchoring the conducting pieces to rotor 2, the conducting piece assemblies 10 in the depicted sectional view transversely of the axis of rotation of the machine would have a trapezoidal shape with the very narrow, shorter trapezoidal side being located radially outside. The permanent magnets 8, as seen in the same sectional view, would also have a trapezoidal shape, but with the shorter trapezoidal side, which is not as narrow as in case of conducting piece assemblies 10, being located radially inside. The portion both of permanent magnets 8 and of conducting piece assemblies 10 close to air gap 12 will be referred to as a "head portion" in the present patent, whereas the end portion remote from air gap 12 (or the portion adjacent bandage 4) will be referred to as "foot portion".

Figure 1A:
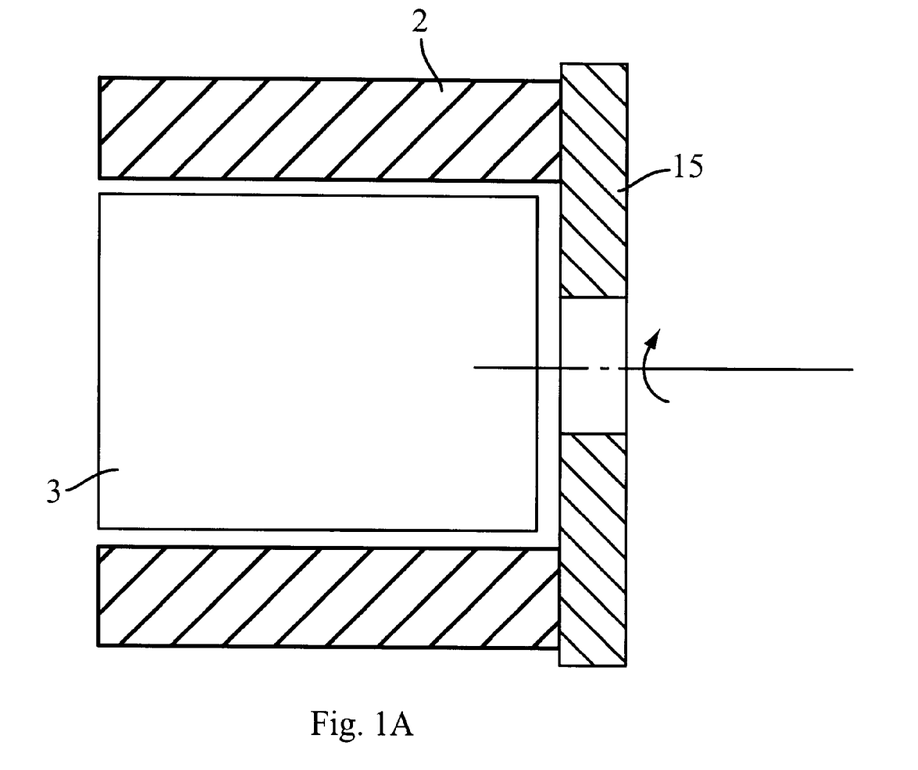
FIG. 1A is a schematic illustration of the external rotor and stator according to the invention in cross-section.
Figure 1B:
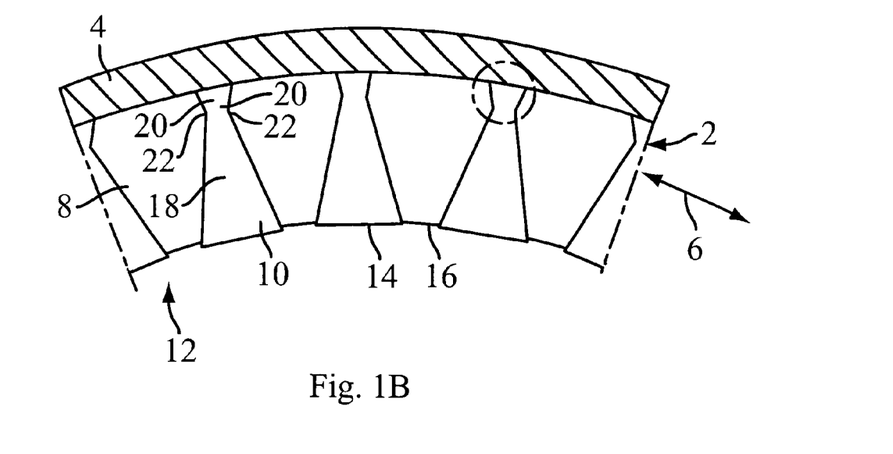
FIG. 1B shows a cross-sectional view of part of an external rotor according to a first embodiment of an electric machine.

In the embodiment according to FIG. 1B, each conducting piece assembly 10 consists of one conducting piece.

Embodiments further below will make clear that the particular conducting piece assembly 10 may also consist of two conducting pieces or still more conducting pieces.

On the basis of the afore-mentioned trapezoidal basic configuration, each conducting piece assembly 10 at the radially outer foot end is provided with a widened portion in the circumferential direction. Due to the fact that each conducting piece assembly 10, in the sectional view concerned, is symmetrical with respect to the illustrated radial central plane 18 containing the rotor axis, a shoulder 20 thus is formed on each circumferential side. The respective shoulder area 22 serving for support on adjacent permanent magnet 8, in the embodiment shown, does not extend tangentially, but is inclined at an angle of about 70 degrees with respect to the tangential direction. Permanent magnets 8 are formed in complementary manner, so that permanent magnets 8 in their foot portion become narrower again in circumferential direction. Each conducting piece assembly 10 thus is supported on two adjacent permanent magnets 8 in positive manner by way of its shoulders 20 and in this way is fixed against displacement radially towards the inside, i.e. in the direction towards air gap 12. Permanent magnets 8 cannot become displaced radially towards the inside of the rotor since they are wedged in between two adjacent conducting piece assemblies 10.

The bandage 4 takes up the centrifugal forces acting on permanent magnets 8 and conducting piece assemblies 10. When the magnetic forces acting on conducting pieces 10 so as to attract them in radially inward direction, exceed the particular centrifugal force acting in radially outward direction on the particular conducting piece or assembly 10, conducting pieces 10 are held on the respective adjacent permanent magnets 8 by way of a vault-like support. Securing of the conducting pieces 10 in bandage 4 against displacement radially inside is not necessary, but could be provided in addition.

Permanent magnets 8 are magnetized in a circumferential direction. In conducting pieces 10, the magnetic flux changes to the radial direction. The half of the magnetic flux exit area 14 of each conducting piece 10 has considerably less width (in circumferential direction) than the radial extension of an adjacent permanent magnet 8, so that a magnetic flux concentration of about 3:1 is present.

Figure 2:
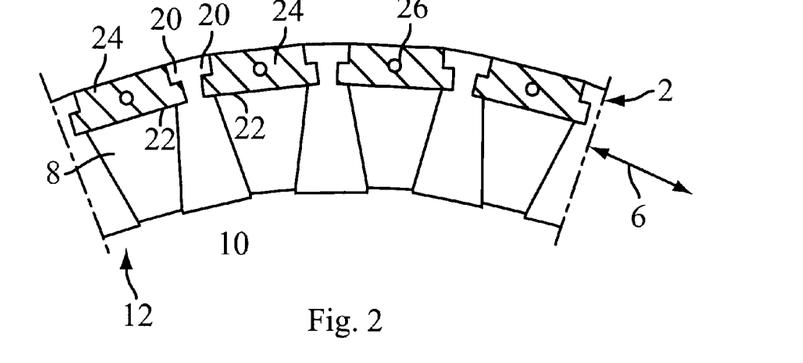
FIG. 2 shows a cross-sectional view of part of an external rotor according to a second embodiment of an electric machine.
Figure 4:
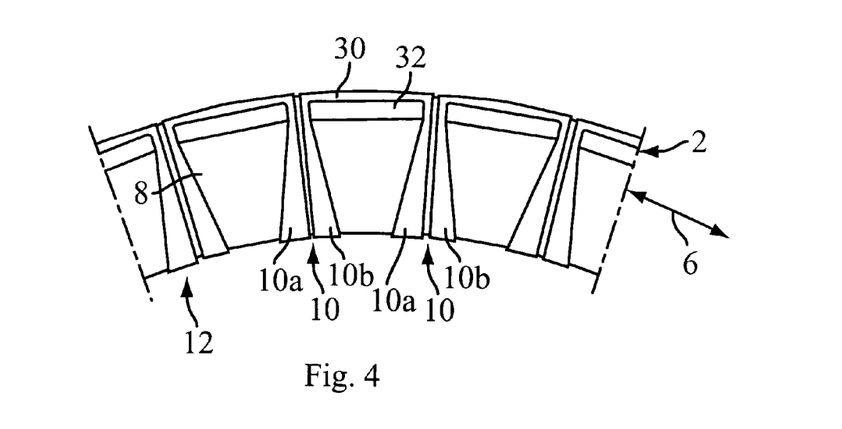
FIG. 4 shows a cross-sectional view of part of an external rotor according to a fourth embodiment of an electric machine.
Figure 5:
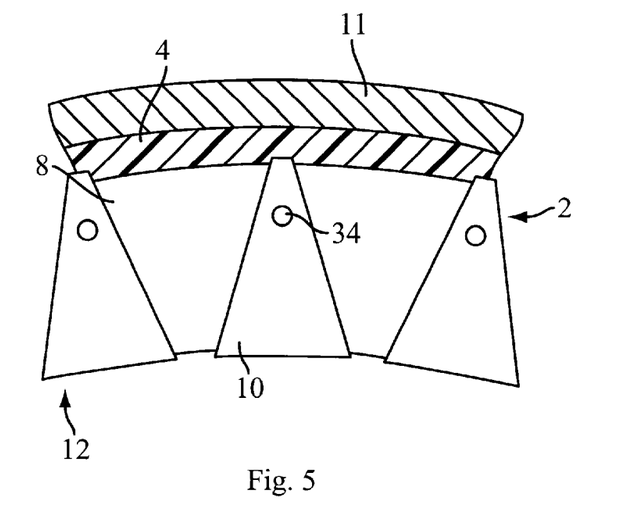
FIG. 5 shows a cross-sectional view of part of an external rotor according to a fifth embodiment of an electric machine.
Figure 7:
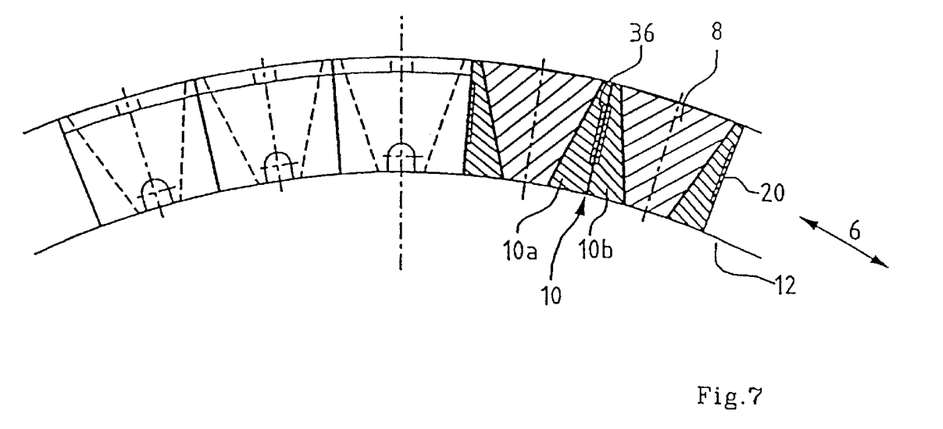
FIG. 7 shows a cross-sectional view of part of an external rotor according to a sixth embodiment of an electric machine.

It is to be pointed out here that in the embodiments according to FIGS. 2, 4, and 7, an outer bandage corresponding to the bandage 4 shown in FIGS. 1 and 5 is not depicted, but is usually provided. On the other hand, it is pointed out here that an outer bandage 4 is not cogently necessary. In connection with FIG. 2, it will be elucidated what an alternative construction could look like.

The embodiment according to FIG. 2 differs from the embodiment according to FIG. 1, firstly, in that the shoulders 20 of conducting piece assemblies 10 are not constituted by obliquely extending shoulder areas, but by shoulder areas 22 extending in tangential direction. Another special feature consists in that the circumferential width of conducting piece assemblies 10 increases in a step-like manner at a location a bit further inside. This does not have to be so; the respective shoulder 20 could also start from the oblique trapezoidal surface, but then would have to extend somewhat further in the circumferential direction than in the illustrated embodiment.

An additional difference consists in that conducting piece assemblies 10 are not supported on adjacent permanent magnets 8 of complementary design, but on two adjacent supporting members 24 each, which in turn are attached to the rotor structure. Radially inside of each supporting member 24, there is provided a trapezoidal permanent magnet 8 without modification.

Supporting members 24 consist e.g. of plastics material and are attached to the rotor structure in any manner known to the expert. With reference to the embodiment of FIG. 2, the possibility is conceivable of providing no outer bandage 4 at all, and to provide instead on both sides of rotor 2 and axially beside permanent magnets 8, conducting piece assemblies 10 supporting members 24, a mounting portion, e.g. in the form of an annular disc taking ¼ of the radial height of conducting pieces 10. In these annular discs, supporting members 24 may be mounted e.g. by means of a bolt 26.

By way of FIG. 2, one can also visualize that it is possible as an alternative to provide between two adjacent permanent magnets 8, a conducting piece assembly 10 of two mutually symmetrical conducting pieces instead of one integral conducting piece 10 as in FIG. 1. Each individual conducting piece then would have only one shoulder 20 on one side for support on an adjacent supporting member 24.

Figure 3:
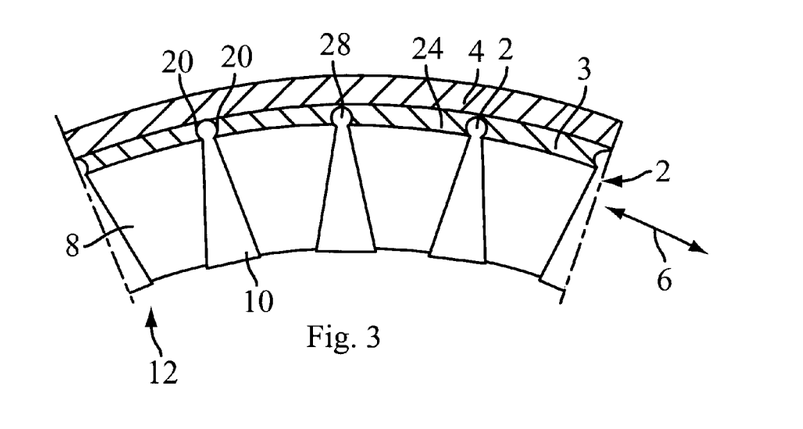
FIG. 3 shows a cross-sectional view of part of an external rotor according to a third embodiment of an electric machine.

The embodiment according to FIG. 3 differs from the embodiment according to FIG. 1 in essence in that conducting pieces 10 at the foot end have a widened portion 28 of almost fully circular configuration in the section shown. On could also say in other words that the thus formed shoulders 20 are curved in the manner of an arc of a circle. Conducting pieces 10 are supported on supporting members 24 of plastics material by way of shoulders 20. The drawing shows an outer bandage 4.

In the embodiment according to FIG. 4, each conducting piece assembly 10 is divided into two conducting pieces 10a and 10b along a radial plane containing the axis of rotation of rotor 2. A conducting piece 10a is connected to a conducting piece 10b of an adjacent conducting piece assembly 10 at the radial outside across permanent magnet 8 located therebetween. By way of this "connecting bridge" 30, the two conducting pieces 10a and 10b are supported on intermediate permanent magnet 8. Between connecting bridge 30 and the permanent magnet disposed there, there is provided an intermediate piece 32 of plastics material. Each connecting bridge 30 can be conceived of as a "grown together" transition between the shoulders of the two conducting pieces 10b, 10a of two adjacent conducting piece assemblies 10.

Figure 6A:
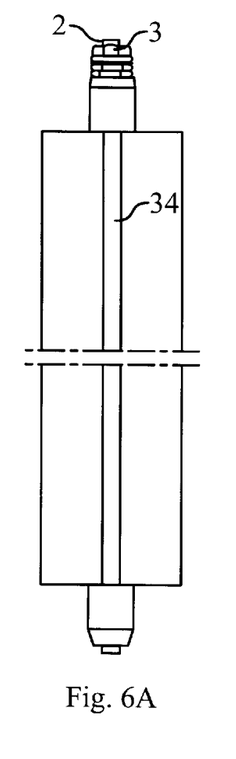
FIG. 6A shows a partial view of the external rotor of FIG. 5 as seen from the outside of the rotor.
Figure 6B:
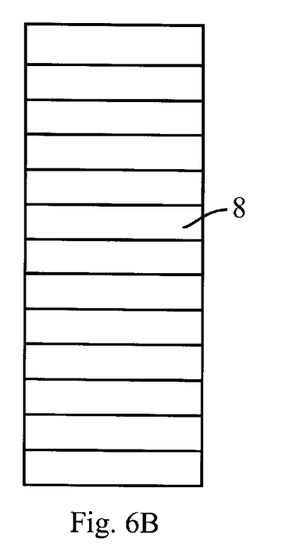
FIG. 6B shows a partial plan view of another section of the external rotor of FIG. 5 where the section is viewed in the same direction as that of FIG. 6A, i.e., radially towards the axis of the machine.

In the embodiment according to FIGS. 5 and 6, each conducting piece assembly 10 is held by means of an axially extending bolt 34 which in turn is fixed to the rotor structure. Possible examples in this respect would be mounting portions of rotor 2 which are provided on both sides axially beside permanent magnets 8 and conducting piece assemblies 10, analogously to the description given in context with FIG. 2. Moreover, it is shown in FIG. 6A that the particular conducting piece assembly 10 is designed as a stacked sheet metal structure. It is expressly pointed out that it is possible as an alternative in all embodiments to design the conducting piece assemblies 10 as stacked sheet metal structures. As shown in FIG. 6B, permanent magnets 8 may be stacked sheet metal structures.

It is advantageous when the bolts 34 upon assembly of rotor 2 are under tensile bias. It is advantageous furthermore to design the two ends of the respective bolt 34 projecting from conducting piece assembly 10 (or the bolt head and the bolt nut) with a relatively large diameter and/or relatively large axial length, so that bolt 34 can be fixed in the rotor structure with relatively low surface pressure, and the shear strain acting on the bolt at the transition from conducting piece 10 to the mounting portion disposed axially outside is reduced to a minimum. Preferably, the conducted piece assemblies 10 and/or permanent magnets 8 are mounted on portion 15 of rotor 2.

As shown in FIG. 5, a metallic magnetic layer 11 maybe provided outside of bandage 4. Metallic layer 11 takes up residual magnetic flux, so that no eddy currents will be induced in an outer metal housing, for example, of the machine. Metallic layer 11 is preferably made of a ferromagnetic and electrically conducing material and as a result, alternating flows toward the outside are efficiently shielded in the rotor area. Preferably, stacked metal sheets or laminated sheet material is used to form metallic layer 11 in order to reduce losses associated with the shielding effect (i.e., eddy currents).

In the embodiment according to FIGS. 7 and 8, there are again provided conducting piece assemblies 10 that are each divided between two adjacent permanent magnets and along a radial plane containing the axis of rotation of the rotor, into two conducting pieces 10a and 10b. In the region of the dividing plane between the two conducting pieces 10a, 10b, there is incorporated a pocket 36 which in the sectional view shown has the shape of a high rectangle with narrow dimensions in circumferential direction. In this manner, a narrow shoulder 20 is formed in each conducting piece 10a, 10b by the radial outer end of pocket 36. Through each pocket 36, a supporting member 24 extends having a complementary configuration of a high rectangle with narrow dimensions in circumferential direction. Supporting members 24 are each connected in pairs by means of face plates 38 so as to form a supporting frame 40 illustrated in FIG. 8. Face plates 38 have protrusions 42 projecting in axial direction, through which they are attached to the rotor structure, e.g. by means of screws attached from radially inside to bandage 4, not shown. Another possibility consists in that the supporting frames 40 are supported on the one hand on the bandage and on the other hand on mounting portions of rotor 2 provided on both axial sides beside permanent magnets 8 and conducting pieces 10.

Figure 8:
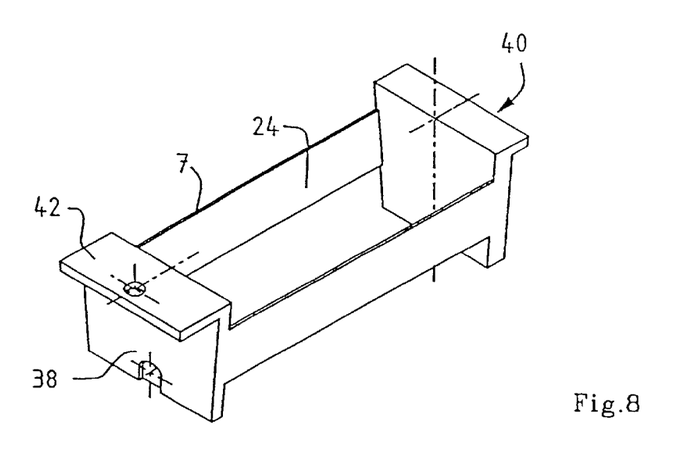
FIG. 8 shows a perspective view of a supporting frame of the external rotor of FIG. 7.

It is pointed out that it is possible by way of an alternative not to connect two adjacent supporting members 24 so as to form a supporting frame 40, but to secure them individually to the rotor structure, e.g. in mounting portions of rotor 2 provided axially beside permanent magnets 8 and conducting piece assembly 10.

Figure 9:
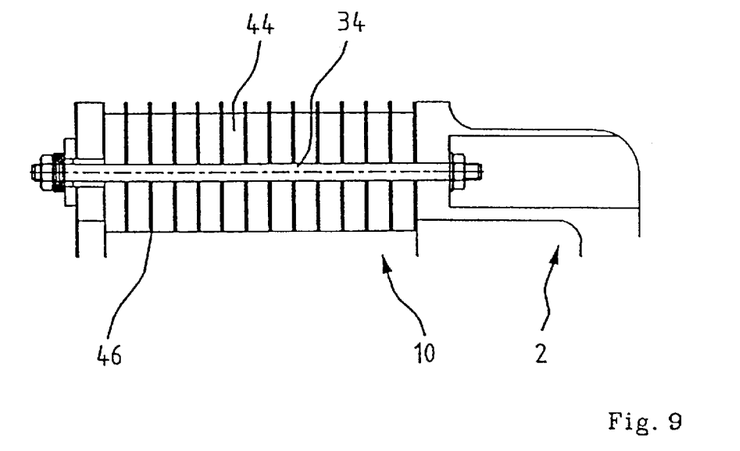
FIG. 9 shows a longitudinal section of part of an external rotor according to a seventh embodiment of an electric machine.

In the embodiment according to FIG. 9, each conducting piece assembly 10 (which—as seen in cross-section through the rotor axis—is located between a permanent magnet assembly 8 adjacent on the left-hand side in circumferential direction and a permanent magnet assembly 8 following on the right-hand side) is divided into a plurality of partial lengths 44 stacked in axial direction, which could also be referred to as conducting piece plates of trapezoidal shape in an axial view. Between two adjacent conducting piece plates 44 there is provided one round plate 46 each, which in an axial view has an annular shape with inside diameter and outside diameter. Each round plate 46 consists of non-ferromagnetic material, preferably of plastics material. The entire "package" of flux conducting plates 44 and round plates 46 is attached to rotor 2 by means of a bolt 34 passed through corresponding holes in flux conducting plates 44 and round plates 46. At each contacting area between a flux conducting plate 44 and a round plate 46, the two components are adhered to each other. Furthermore, it is deemed advantageous and preferred to apply a clamping force onto the "package" described via bolt 34.

Adjacent in the circumferential direction, there may be provided a permanent magnet 8 that is continuous in an axial direction; and in this case, the round plates 46, which as mentioned are continuous in the circumferential direction, would have to be recessed there correspondingly. Alternatively the permanent magnets 8 may have a corresponding axial splitting as in case of the conducting piece assemblies 10. The representation in the drawing then would be quite analogous to that of FIG. 9 there too. Again, a bit further in circumferential direction, another "package" of conducting piece plates 44 and round plates 46 follows.

It is recognizable that each adhesive bond between a conducting piece plate 44 (or permanent magnet plate) and two adjacent round plates 46 only needs to take up those forces that originate from the particular conducting piece plate 44. It is possible to make the openings for bolt 34 in conducting piece plates 44 and in round plates 46 larger than the bolt diameter, but it would also be possible to use the same diameter.

The embodiment according to FIG. 10 also shows round plates 46 corresponding basically to those described in connection with FIG. 9. However, the round plates 46 on their radial outside have a projecting length 48 in relation to conducting piece plates 44 and permanent magnets 8 or permanent magnet plates. The radially projecting length 48 can be utilized for inserting, into openings 50 therein, a plurality of bolts, not shown, distributed over the circumference and to clamp together the package of round plates 46 and conducting piece plates and/or permanent magnet plates by means of the bolts. In addition there, bolts extending through the conducting piece plates 44 can be provided analogously to the embodiment of FIG. 9, but this is not cogently required.

Figure 10:
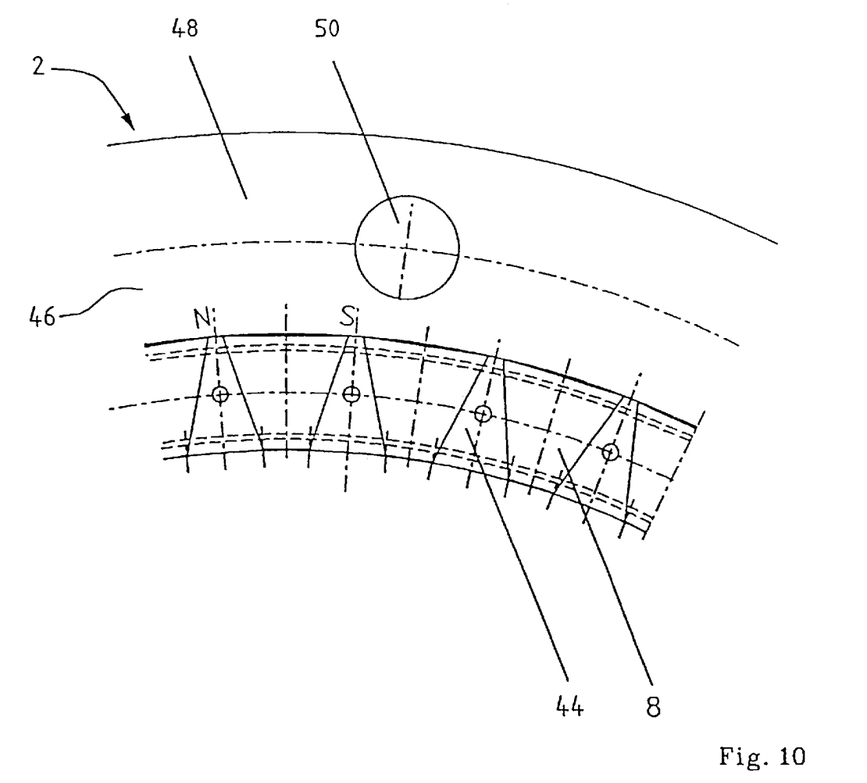
FIG. 10 shows a cross-sectional view of part of an external rotor according to an eighth embodiment of an external rotor.

Especially with the embodiments of FIGS. 9 and 10, one can see that no enclosing or force-receiving structure, e.g. of the type of the bandage described, is necessary.

It is as a rule advantageous with all embodiments to adhere the conducting piece assemblies 10 in addition to the bandage 4, if provided. Adhesive bonds of the conducting pieces or partial lengths of the conducting pieces 10 to permanent magnets 8 and/or bandage 4 and/or round plates 46 have a damping effect and reduce the noise level of rotor 2 during operation.

What is claimed is:

1. An electric machine comprising a stator and an external circumferential rotor separated by a cylindrical air gap, said rotor having an axis, a head portion adjacent the air gap and a foot portion and being formed with a plurality of permanent magnet assemblies magnetized substantially in the circumferential direction, and a plurality of magnetic flux conducting piece assemblies, each magnetic flux conducting piece assembly being arranged between two permanent magnets;

wherein each permanent magnet assembly has an increasing circumferential width from the head portion to the foot portion, and each said magnetic flux conducting piece assembly has a decreasing circumferential width from the head portion to the foot portion;

wherein each conducting piece assembly is composed of a plurality of stacked metal sheets, the stacked sheet metal assembly being retained on the rotor by means of a bolt axially extending through the stacked sheet metal assembly;

wherein each permanent magnet assembly is composed of a plurality of plate-like permanent magnets stacked in the direction of the rotor axis; and wherein said external rotor has a cup-shaped configuration and comprises a mounting portion, on only one side, axially beside the permanent magnet assemblies and the conducting piece assemblies, the permanent magnet assemblies and the bolt being mounted to the mounting portion of the rotor.

2. The electric machine of claim 1, wherein the conducting piece assemblies each are symmetrical with respect to a radioal plane containing the rotor axis.

3. The electric machine of claim 1, further comprising an annular bandage surrounding the permanent magnet assemblies and the conducting piece assemblies.

4. The electric machine of claim 3, further comprising a metallic layer which is located on the outside of the annular bandage to take up residual magnetic flux.

5. The electric machine of claim 3, wherein the annular bandage is a fiber-reinforced plastics material.

6. The electric machine of claim 4, wherein the annular bandage located between the permanent magnets and the conducting piece assemblies and the metallic layer substantially only has a function of electrical isolation.

7. The electric machine of claim 4, wherein the metallic layer is ferro-magnetic and electrically conductive.

8. The electric machine of claim 7, wherein the metallic layer is formed of laminated sheet metal material.

9. The electric machine of claim 1, wherein adhesive bonds are provided between the permanent magnet assemblies and the conducting piece assemblies.

* * * * *